US011303680B2

(12) United States Patent
Marfia et al.

(10) Patent No.: US 11,303,680 B2
(45) Date of Patent: Apr. 12, 2022

(54) METHOD AND SYSTEM FOR REMOVING REDUNDANT RECEIVED DATA FLOWS OF INTERCEPTION IN IMS DOMAINS

(71) Applicant: TELEFONAKTIEBOLAGET LM ERICSSON (PUBL), Stockholm (SE)

(72) Inventors: Francesca Marfia, Pagani (IT); Lorenzo Fiorillo, San Nicola la Strada (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 535 days.

(21) Appl. No.: 15/740,109

(22) PCT Filed: Jul. 15, 2015

(86) PCT No.: PCT/EP2015/066124
§ 371 (c)(1),
(2) Date: Dec. 27, 2017

(87) PCT Pub. No.: WO2017/008847
PCT Pub. Date: Jan. 19, 2017

(65) Prior Publication Data
US 2018/0337960 A1 Nov. 22, 2018

(51) Int. Cl.
*H04W 12/80* (2021.01)
*H04M 3/22* (2006.01)
(Continued)

(52) U.S. Cl.
CPC ........ *H04L 63/306* (2013.01); *H04M 3/2281* (2013.01); *H04W 12/80* (2021.01); *H04W 28/10* (2013.01)

(58) Field of Classification Search
CPC .... H04L 63/306; H04W 12/80; H04W 28/10; H04M 3/2281
See application file for complete search history.

(56) References Cited

U.S. PATENT DOCUMENTS 7,447,909 B2* 11/2008 Reith ................... H04L 63/083
709/225
8,903,988 B2  12/2014 Di Donato et al.
(Continued)

FOREIGN PATENT DOCUMENTS

CN  101273649 A  9/2008
CN  101983503 A  3/2011
(Continued)

OTHER PUBLICATIONS

"Universal Mobile Telecommunications System (UMTS); LTE; 3G security; Handover interface for Lawful Interception (LI)" 3GPP TS 33.108 version 12.8.0 Release 12; Apr. 2015; p. 56. (Year: 2015).*
(Continued)

*Primary Examiner* — Christopher M Crutchfield
*Assistant Examiner* — Tito Q Pham
(74) *Attorney, Agent, or Firm* — Patent Portfolio Builders PLLC

(57) ABSTRACT

The disclosure relates to a method in a Lawful Intercept, LI, management system for removing redundant content of communication, CC flows. Said LI management system is capable of receiving and handling one or more CC flows generated from intercepted target communication sessions. Each CC flow comprises a flow of data packets, each data packet comprising a flow identity of the CC flow. The flow identity comprises an address of a sending intercept access point, IAP, at least one target identifier, TID, and a communication session Correlation Identifier, CI. The method enables the LI management system to forward only one CC flow of CC flows having identical TID and CI, respectively, but different sending intercept access points.

13 Claims, 10 Drawing Sheets

(51) Int. Cl.
*H04W 28/10* (2009.01)
*H04L 29/06* (2006.01)

(56) References Cited

U.S. PATENT DOCUMENTS

| | | | |
|---|---|---|---|
| 9,042,388 B2 | 5/2015 | Iovieno et al. | |
| 2011/0032840 A1* | 2/2011 | Di Donato | H04L 43/00 370/252 |
| 2011/0287781 A1* | 11/2011 | Santoro | H04L 41/12 455/456.1 |
| 2012/0096145 A1* | 4/2012 | Le | G06Q 50/265 709/224 |
| 2016/0226751 A1* | 8/2016 | Yamana | H04L 45/22 |

FOREIGN PATENT DOCUMENTS

| | | | |
|---|---|---|---|
| CN | 102106133 A | 6/2011 | |
| EP | 2277934 A1 | 1/2011 | |
| WO | 2007/149769 A2 | 12/2007 | |
| WO | 2009/123514 A1 | 10/2009 | |
| WO | 2010/009766 A1 | 1/2010 | |
| WO | 2010071524 A1 | 6/2010 | |

OTHER PUBLICATIONS

International Search Report and Written Opinion, dated Apr. 1, 2016, from corresponding PCT Application No. PCT/EP2015/066124.
Office Action in corresponding/related Chinese Application No. 201580081704.9 dated Apr. 14, 2020 (All references not cited hereiwth have been previously made of record.).
Search Report in corresponding/related Chinese Application No. 201580081704.9 dated Apr. 14, 2020. (All references not cited hereiwth have been previously made of record.).
English Translation of Search Report in corresponding/related Chinese Application No. 201580081704.9 dated Apr. 14, 2020 previously made of record in an Information Disclosure Statement submitted May 14, 2020.

* cited by examiner

METHOD AND SYSTEM FOR REMOVING REDUNDANT RECEIVED DATA FLOWS OF INTERCEPTION IN IMS DOMAINS

TECHNICAL FIELD

The present technology is related to Lawful Interception of IP Multimedia subsystem data communication. More specifically, the present technology refers to Lawful Interception management system and methods for removing redundant content of communication, CC, flows. It is further provided a computer program, computer program product and carrier.

BACKGROUND

According to the current Lawful Interception, LI, standards and technology, the lawful interception of IP Multimedia Subsystem, IMS, communications is done by means of multiple Interception Access Points, IAPs, in the IMS network.

From LI point of view, the main points of interception are the:
- Interconnection Border Control Function (IBCF), Serving Call Session Control Function (S-CSCF) and Proxy—Call Session Controller Function (P-CSCF) for interception of signaling, i.e. Session Initiation Protocol (SIP) messages, in the IMS layer. The IBCF and P-CSCF are normally co-located in the Session Border Gateway (SBG) node.
- Border Gateway Function (BGF) for interception of the media. This function is co-located in SBG together with the P-CSCF. The BGF function can also be located in a Media Resource Server (MRS) node (under control of the P-CSCF via H.248 protocol).
- Access Transfer Control Function (ATCF) and Access Transfer Gateway (ATGW) for interception of SIP and media for VoLTE after SRVCC (Single Radio Voice Call Continuity) is used (these functions are co-located in SBG). The ATGW can also be located in the MRS node (under control of the ATCF via H.248).

Additional points of interception are:
- Application Server (AS)
- Media Gateway Controller (MGC)
- Media Gateway (MGW)

In the IMS domain the intercepted information is redundant because each intercepted SIP message/packet of a communication session can be sent several times to the LEA. This can happen when interception is performed at different points of the communication.

SUMMARY

One object of the following disclosure is to provide a technique for removing redundant content of communication flows forwarded to a Lawful Enforcement Agency, LEA.

According to one aspect of the provided technique, a method and embodiments of said method are disclosed, wherein said method is performed for removing redundant content of communication, CC, flows, which are generated by Lawful Interception, LI, from one or more intercepted target communication sessions of intercepted users, targets. Each CC flow comprises a flow of data packets, and each data packet comprises a flow identity of the CC flow. The flow identity comprises an address of a sending intercept access point, IAP, at least one identifier of the target, TID, and a communication session Correlation Identifier, CI. The method comprises the steps of receiving a CC flow of data packets from an IAP, retrieving the CC flow identity from the received CC flow, identifying any other CC flow being delivered to a Law Enforcement Agency, LEA, wherein said other CC flow has identical TID and CI, respectively, as the received CC flow and forwarding to the LEA only one of the CC flows of data packets having identical TID and CI, respectively, by dropping the received CC flow if it has other sending IAP address than said other CC flow being delivered.

According to another aspect of the provided technique, a Lawful Intercept, LI, management system and embodiments of said system are disclosed. The LI management system is adapted to remove redundant content of communication, CC, flows. Said LI management system is capable of receiving and handling one or more CC flows generated from one or more intercepted communication sessions of intercepted users, targets. Each CC flow comprises a flow of data packets, and each data packet comprises a flow identity of the CC flow. The flow identity comprises an address of a sending intercept access point, IAP, at least one target identifier, TID, and a communication session Correlation Identifier, CI. The LI management system comprises a processing circuitry being adapted to operatively receive a CC flow of data packets from an IAP, to retrieve the CC flow identity from the received CC flow, to identify any other CC flow being delivered to a Law Enforcement Agency, LEA, wherein said other CC flow has identical TID and CI, respectively, and to forward only one of the CC flows of data packets having identical TID and CI, respectively, by dropping the received CC flow if having other sending IAP address than said other CC flow being delivered.

According to another aspect of said technique, it is also provided a computer program comprising computer program code which, when run in a processor of a LI Management system causes the system to perform the steps of the method as described above.

According to further one aspect of said technique, it is also provided a computer program product comprising a computer program and a computer readable means on which the computer program is stored.

According to an additional aspect of said technique, it is provided a carrier containing the computer program, wherein the carrier is one of an electronic signal, optical signal, radio signal or computer readable storage medium.

One advantage over prior art with a technique for avoiding sending duplication of the intercepted CC flows to a LEA is that the removal of duplicated intercepted flows allows the operators to respond to the LEA with a unique flow of the intercepted data. This is preserving LEAs to receive unnecessary data, so avoiding possible unpredictable behaviour, including possible errors in decoding. This will be also saving investments on the LEA side, in storage, bandwidth and transport expenses.

BRIEF DESCRIPTION OF THE DRAWINGS

The foregoing, and other, objects, features and advantages of the present technique will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the disclosed technique. However, it will be apparent to one skilled in the art that the disclosed technique may be practiced in other embodiments that depart from these specific details. In other instances, detailed descriptions of well-known methods, devices, and circuits are omitted so as not to obscure the description of the present disclosure with unnecessary detail.

Figure 1:
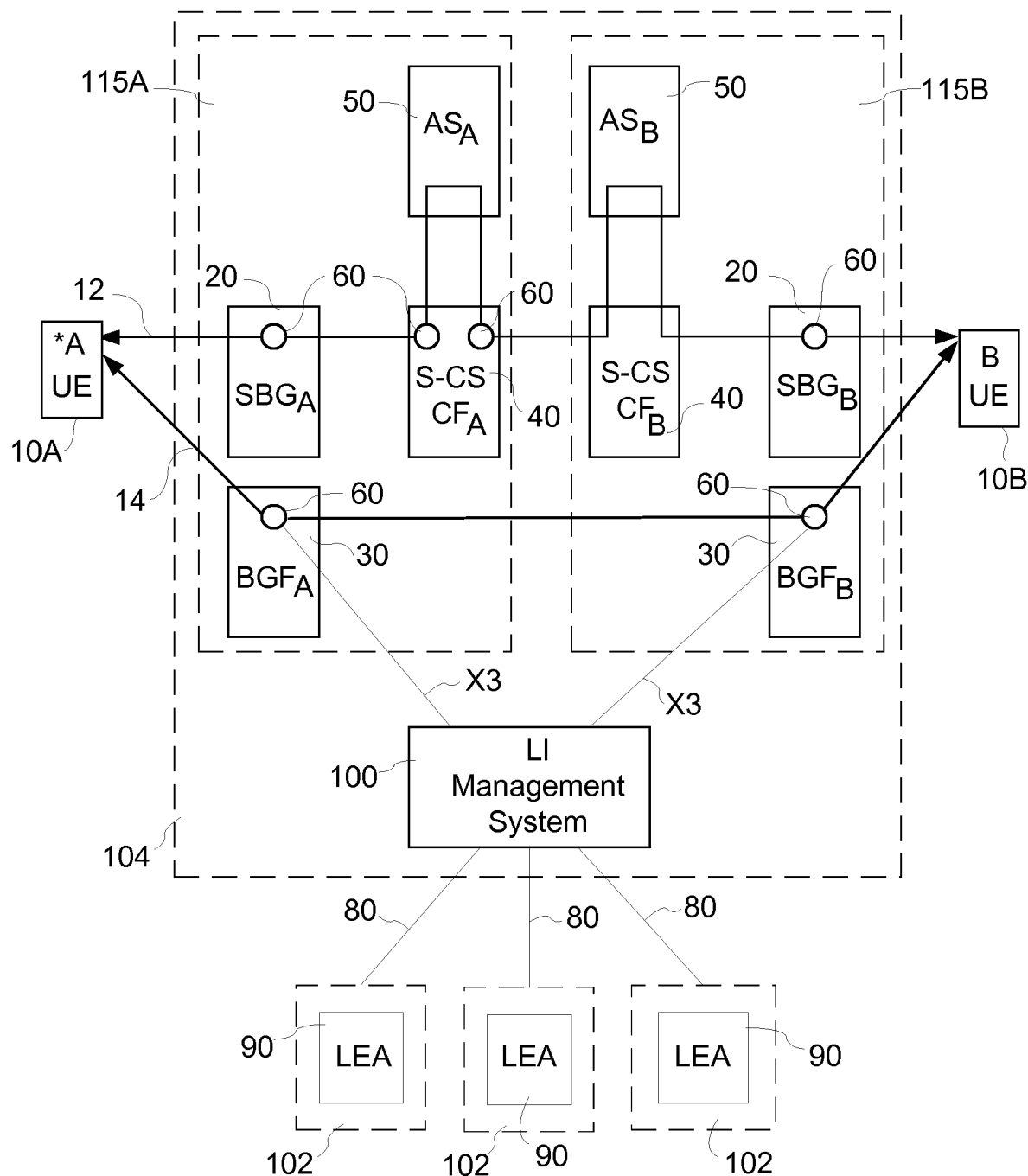
FIG. 1 is a block diagram of an exemplary network in which systems and methods described herein may be implemented.

FIG. 1 is illustrating a schematic telecommunications system configuration supporting a VoLTE call between two User Equipments and a LI management system for supporting LI.

In the illustrated example, the signalling path 12 (during a call session) comprising signalling flow of data packets, and a media path 14 comprising the media part, i.e. Communication Content (CC), of a Voice over Long Term Evolution (VoLTE) call between the two User Equipments, UEs; 10A and 10B. The target, i.e. the intercepted user, for Lawful Interception is indicated with a "*" (asterisk), i.e. in the illustrated example user A using the UE 10A.

The telecommunication system 104 comprises an IMS system involving two IM Subsystems 115A, 115B, and a LI management system 100. The box 104 indicated with dashed lines indicates also the telecommunications operator domain of a LI system. The LI management system 100 is connected to different Law Enforcement Authoritys, LEAs, 90 situated in LEA domains 102 of the LI system.

In the illustrated example, a VoLTE call is served and supported by a telecommunications system wherein the UE 10A is served and supported by an IM Subsystem 115A (box with dashed lines), and the UE 10B is served and supported by an IM Subsystem 115B (box with dashed lines). The elements of IM Subsystem 115A are indicated with the letter "A". The elements of IM Subsystem 115B are indicated with the letter "B". The elements may be distributed in single nodes or in common nodes.

An IM subsystem is divided into different layers, IMS layer and service/application layer. The IM Subsystems of the IM system comprise a Session Border Gateway (SBG) element 20, Border Gateway Function (BGF) element 30, a Serving Call Session Control Function (S-CSCF) element 40. Said elements are belonging to the IMS layer. Further, one or more Application Servers (ASs) 50 of the IMS service/application layer are involved during a call session. An example of such a server is sometimes denoted Application Server, AS.

In the example, five elements/nodes 20, 30, 40 are Interception Access Points (IAP) 60 provided with Interception means. Two of them, BGF 30, are IAPs, for interception of data packet traffic flow, CC, passing through the node/elements 30. From each IAP 30 a copy of the intercepted CC flow via an interface X3 is sent to a LI management system 100. Thus, signalling traffic on the signalling path 12 is passing through the elements/nodes $SBG_A$ (SBG in IMS 115A) 20, $S\text{-}CSCF_A$ (S-CSCF in IMS 115A), $AS_A$ 50 (AS in IMS 115A), $AS_B$ 50 (AS in IMS 115B), $S\text{-}CSCF_B$ (S-CSCF in IMS 115B) and $SBG_B$ (SBG in IMS 115B) 20. The media path 14 comprises the communication content flow of said path 14 between UEs 10A and 10B passing through the elements/nodes $BGF_A$ (BGF in IMS 115A) 30 and $BGF_B$ (BGF in IMS 115B) 30. The CC flow on the media path 14 is intercepted by the IAPs 60 in said elements/nodes 30 and the copy of the corresponding CC flow of data packets are sent over interfaces X3 to the LI management system 100.

The LI management system 100 is adapted to receive CC raw data packets over the X3 interfaces. The LI management system is further adapted to handle and distribute the received CC data packets as CC reports via interface HI3, 80 to one or more of a number of Law Enforcement Agencies, LEAs, 90, having ordered a Lawful Interception of target. CC data packet flows are sent via the HI3 interface.

As stated in the background above of this disclosure, in the IMS domain the intercepted information is redundant because each intercepted packet of a communication session can be sent several times to the LEA. This can happen when interception is performed at different points of the communication.

Figure 2:
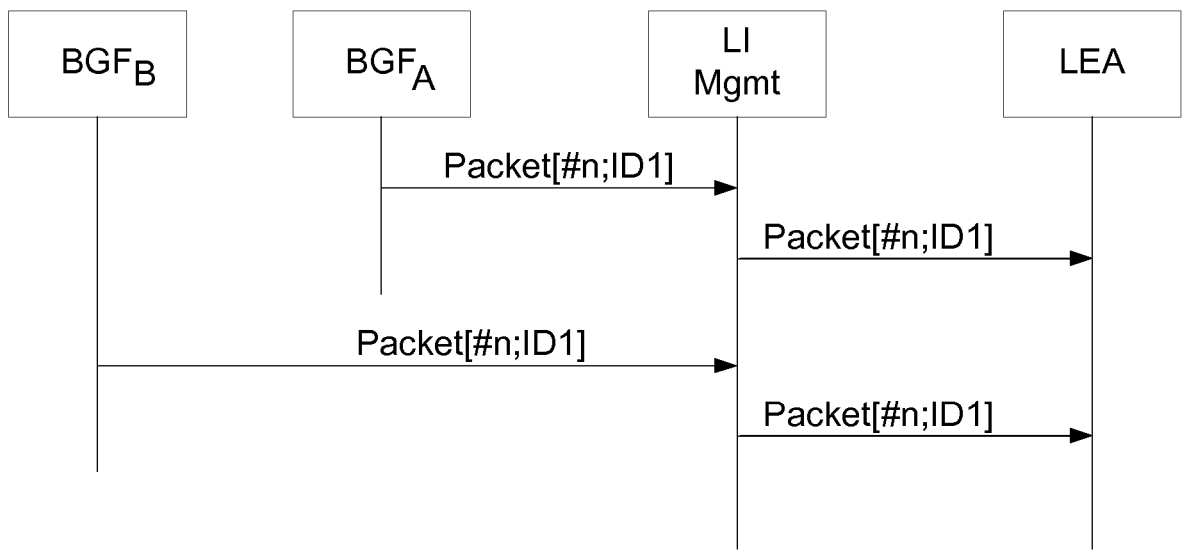
FIG. 2 is a signalling diagram illustrating an example of interception of a target communication session in an IM Subsystem.

FIG. 2 is a signalling diagram illustrating an example of prior art interception of a target communication session in an IM system. As illustrated in FIG. 1, the target communication session comprising target having identity ID1 is intercepted by two different BGFs resulting in that two CC flows comprising data packets #n having identical payload off CC are sent to the LI management system. Any of such flows is then delivered by the LI Management System to the LEA over the HI3 interface. In the example, the same packet is intercepted twice, by the $BGF_A$, $BGF_B$, and sent twice by the LI management system to the LEA.

In addition to the redundancy of packets, a further challenge for the LEA is the case of multi-identity interception, i.e. when a subject is intercepted via more of its own identities, e.g. SIP (Session Initiation Protocol), URI (Uniform Resource Identifier) and TEL (Telephone) URI.

Figure 3:
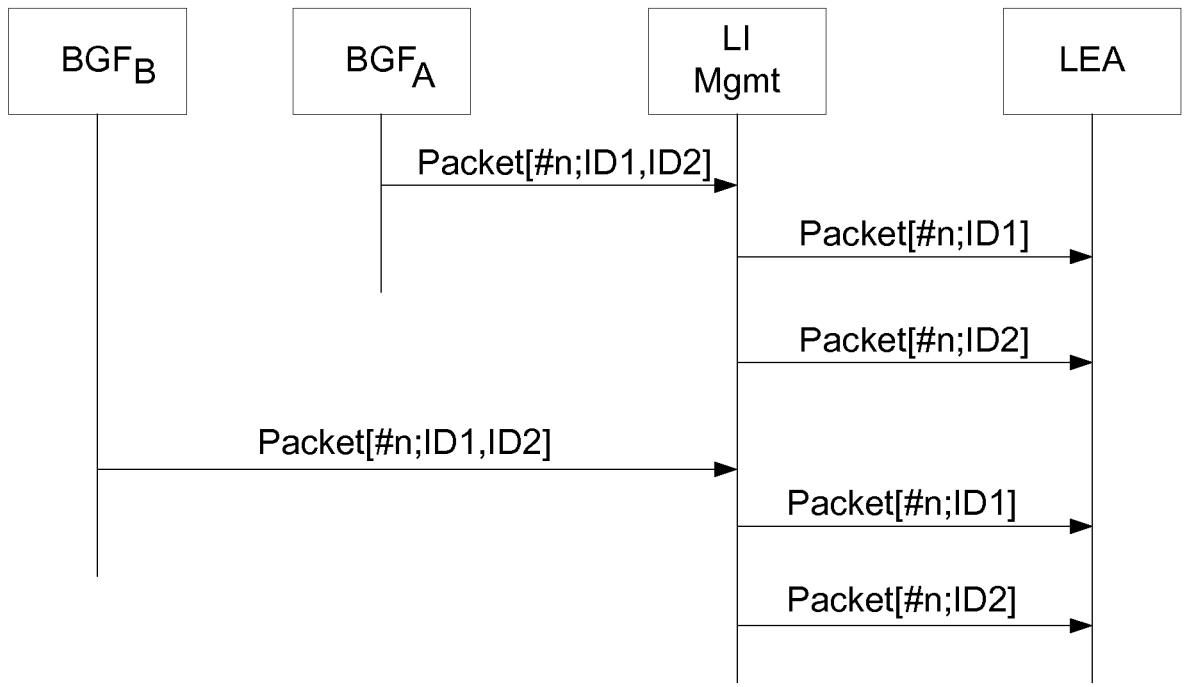
FIG. 3 is a signalling diagram illustrating an example of interception of a target communication session involving multi-identity interception in an IM system.

FIG. 3 is a signalling diagram illustrating an example of interception of a target communication session involving multi-identity interception in an IM Subsystem.

In such case of multi-identity interception ID1 and ID2 there is the following main prior art scenario:

The IAP sends only one CC flow to the LI Management System, i.e. only one copy of the CC packet #n containing all the monitored identities of the intercepted subject, within the header of the packet. In such case the LI Management System multiplies such unique CC flow to multiple HI3 flows towards the LEA, so generating one packet flow per target identity ID1 and ID2.

FIG. 3 shows an example of multi-identity scenario, prior art, when the IAP sends all the target identities in one packet (as described first bullet above).

In the figure above, the intercepted subject Bob has two identities ID1 and ID2. As an example ID1 is a sip: bob@domain.com and ID2 is a tel:+123456789), both of these identities under monitoring. The $BGF_A$ sends the packet #n within one CC flow and $BGF_B$ sends the same packet #n within another CC flow. Such packet contains both the two identities of Bob. The LI management system multiplies and sends four times the packet #n to the LEA by means of 4 different HI3 flows.

Intercepting in multiple IAPs has the relevant drawback of sending redundant CC to the LEA equipment. Such redundant information eats part of the limited capacity available in the connection between the LI management system controlled by a telecom operator and the LEA. There is a reasonable requirement from the operator, LEA and Monitoring Centre to remove redundancies, especially CC redundancy.

One object of the following solution is to introduce a method to be implemented in the Lawful Interception Management System to find out the duplicated packet flows related to the same intercepted subject and to discard, i.e. drop, those packet flows in the operator domain.

The present solution is also applicable in case of multiple identities related to the same intercepted subject.

Figure 4:
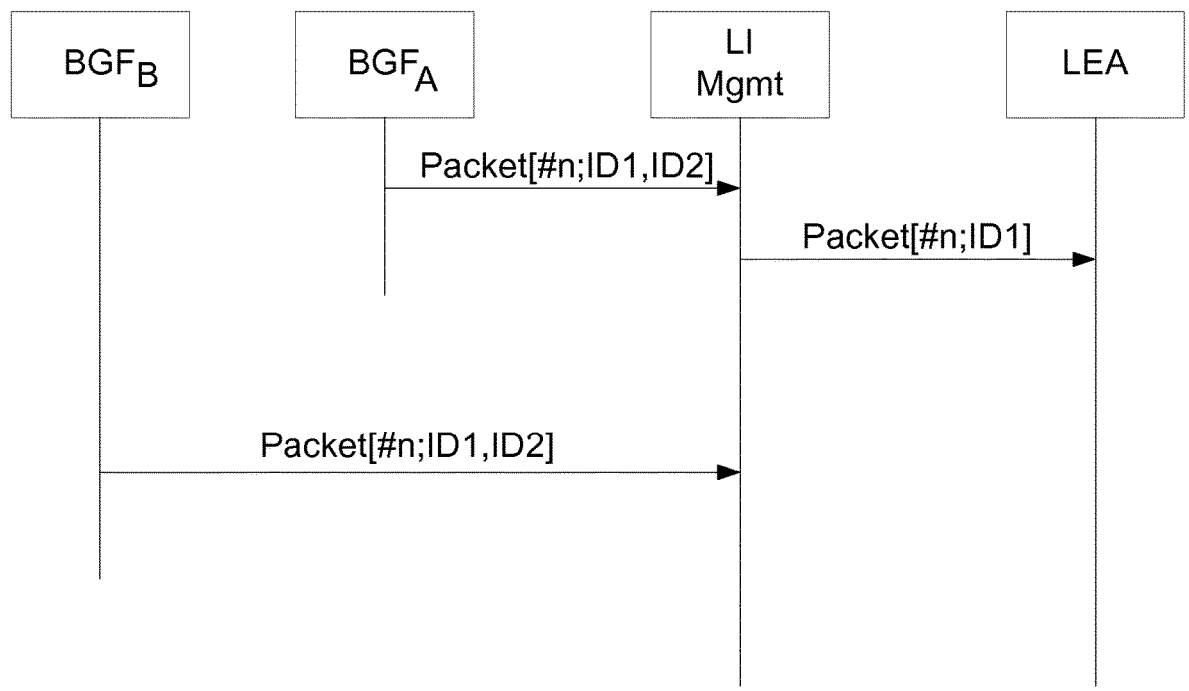
FIG. 4 is a signalling scheme illustrating the effect of the present solution.

FIG. 4 is illustrating the effect of the present solution wherein data packets containing multi-identity of the target will not be multiplied or sent more than one time.

One basic idea is that the LI management system in the operator's network identifies an intercepted packet as belonging to a duplicated flow related to the same intercepted subject or target, based on a set of parameters available in the LI header of the data packets in a flow, without any Deep Packet Inspection.

Figure 5:
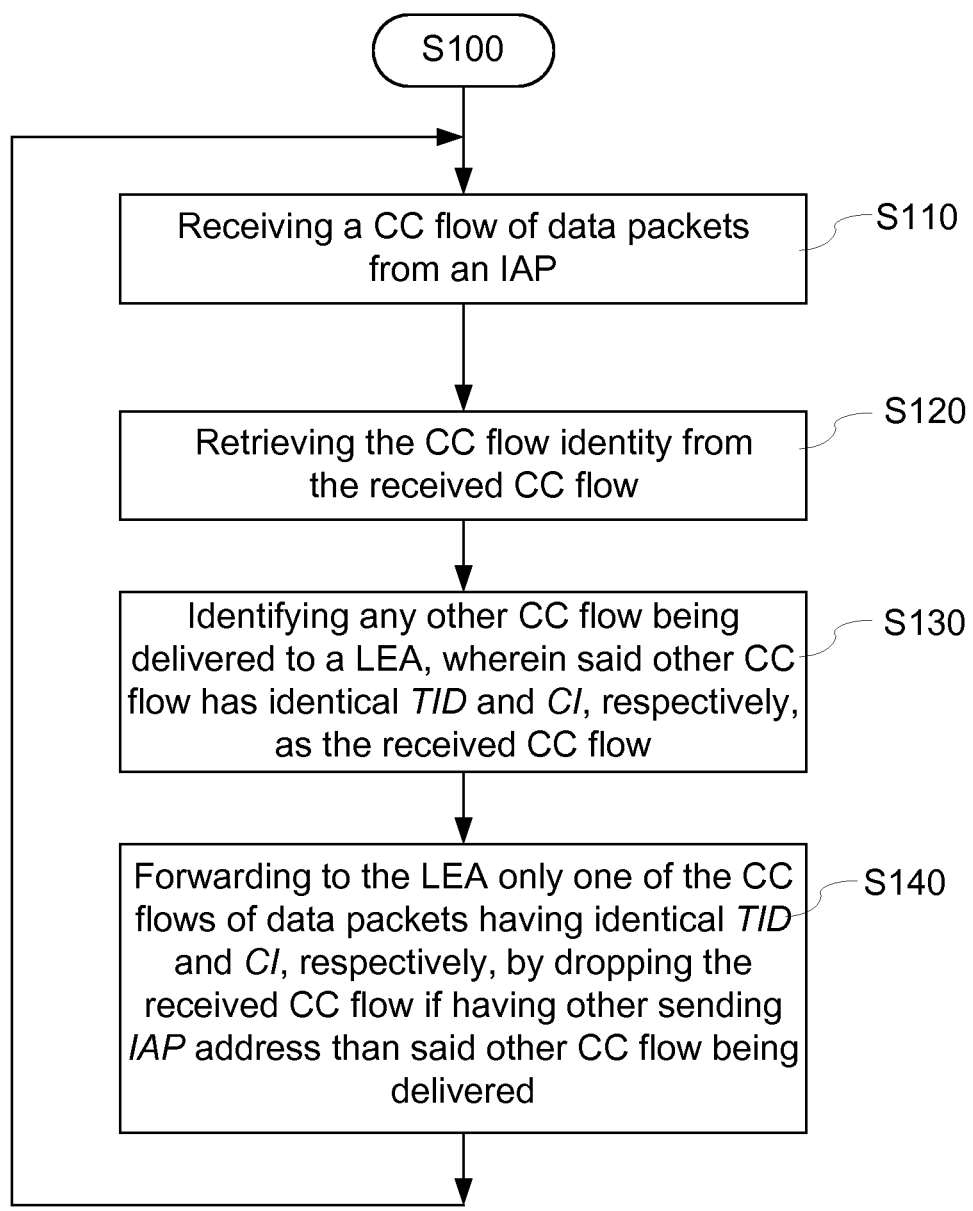
FIG. 5 is a flowchart illustrating a method S100 for identifying and removing redundant flows.

FIG. 5 is a flowchart illustrating a method S100 for identifying and removing redundant flows comprising identical payload of content communication, CC.

With reference to FIG. 1, e.g. for a basic IMS/VoLTE call, there are (at least) two flows of the same intercepted payload which are sent to the LI Management System, and then delivered to the LEA domain.

One idea is to introduce a technique and mechanism to deliver to the LEA just one of the intercepted flows and discard all the remaining packets belonging to other possible flow(s). The technique applies to the case of multi-identity as well.

The method is performed in a Lawful Intercept, LI, management system for removing redundant content of communication, CC flows. Said LI management system is capable of receiving and handling one or more CC flows generated from the same intercepted target communication session, wherein each CC flow comprises a flow of data packets. Each data packet comprises a flow identity of the CC flow, wherein the flow identity comprises an address of a sending intercept access point, IAP, at least one identifier of the target, TID, and a communication session Correlation Identifier, CI. The method comprises:

S110: —Receiving a CC flow of data packets from an IAP;
S120: —Retrieving the CC flow identity from the received CC flow;
S130: —Identifying any other CC flow being delivered to a Law enforcement Agency, LEA, wherein said other flow having identical TID and CI, respectively, as the received CC flow;
S140: —Forwarding to the LEA only one of the CC flows of data packets having identical TID and CI, respectively, by dropping the received CC flow if having other sending IAP address than said other CC flow being delivered.

The method applies to all the IAPs involved in the media handling in IMS/VoLTE networks. Examples of such IAPs can be SBG/BGF and MGC/MGW. When the same CC packet traverses media path (14 in FIG. 1) it may be intercepted by different IAPs (for example originating and terminating side).

In S110, the LI management system is receiving a CC flow from one of the IAPs via the X3 interface. The LI management system is adapted to retrieve, in step S120, the CC flow identity from the received CC flow by checking packet for packet in the received CC flow.

The LI management system is adapted to temporary store the flow identity of any other received flow that is being delivered to LEA. For example, flow identity information of a CC flow is temporary stored as long as the CC flow is delivered to the LEA until the communications session is closed. This enables the LI management system to identify packets by means of a flow identity comprising one or more identifiers belonging to communication sessions.

As a number of CC flows are delivered to a LEA, it is in S130 identified if any other CC flow of said CC flows being delivered to a Law enforcement Agency, LEA, has identical TID and CI, respectively, as the received CC flow. The flow identity of data packets of any other CC flow being delivered to a LEA has been temporarily stored and the flow identities are checked and if any of said other flow having identical TID and CI, respectively, it is identified. For example, the received CC flow has target identifier TID1, correlation identifier CI1, and a CC flow being delivered has target identifier TID2 and correlation identifier CI2, said flows have identical, or the same, TID and CI, respectively, if TID1=TID2 and CI1=CI2.

In S140, if TID1=TID2 and CI1=CI2 for two CC flows of which one is being delivered to a LEA, the sending IAP addresses of said CC flows are checked. The sending IAP addresses of said CC flows, IAP1 for the received CC flow and IAP2 for the CC flow being delivered, are not identical, as said CC flows are generated by different IAPs but for the same target and communication session. The received CC flow is than considered to be duplicated (by another IAP), and the received CC flow could be dropped. Data packets having identical flow identity belongs to the same communication session and CC flow and should not be deleted as they have different CC payload.

Thus, if the identification step S130 results in the identification of another CC flow having identical TID and CI, respectively, as the received CC flow, the method forwards, or delivers, to the LEA in S140 only one CC flow of data packets having identical TID and CI, respectively, by dropping the received CC flow if the received flow has another sending IAP address than the CC flow being delivered. The received CC flow is duplicated if having identical TID and CI, respectively, but different sending IAP addresses.

A CC flow on the interface X3 is related to a single target that can be identified by the identifiers in the flow identity comprising:
Sending IAP address (IAP);
Target Identifier (TID).
Correlation Identifier (CI), which identifies a communication session.

Going into details:

IAP: It is the address, e.g. IP address, of the IAP sending the CC flow on the X3. The address of the node sending CC traffic can be retrieved from the received CC packets.

Target Identifier (TID): it is retrieved from the CC data packet header. It is also possible to find more than one TID in a data packet header (as illustrated in FIG. 3). The target identifier can also be intended as an identifier for all identities of the same intercepted subject, multi-identity interception. In this case there will be a TID_master for the intercepted subject and other detailed TID, TID_detail, for each identity in a TID list stored in the LI management system. For example if an intercepted subject Bob has two identities, SIP-URI: bob@domain.com, and TEL-URI: tel:+123456789, then a TID_master will be present in the LI management system for representing the target A and the two TID_detail will be present, one for each identity. When the LI management system is provisioned for starting an interception it is specified which target identity shall be monitored. Such information is kept in a LI management system database DB and when a function, e.g. DF3, needs to access such data then it requests and receives the data from such central target database.

One option is multi-identity provisioning, where it is possible to specify more technical identities of a target, e.g. SIP URI (Session Initiation Uniform Resource Identifier), TEL URI (Uniform Resource Identifier for TELephone numbers), MSISDN (Mobile Station International Subscriber Directory Number), etc., in such case the DB keeps all the 3 technical identities associated to the same intercepted subject.

Correlation Identifier (CI): it is present in the CC packets. Multiple flows delivered with the same CI belong to the same communication session.

Two CC flows having the same TID and CI are considered duplicated when they come from different IAP addresses.

In case an intercepted subject has multi-identities, e.g. SIP-URI and TEL-URI, the method sends only one packet flow per intercepted subject. This means that if the LI Management System receives from each IAP only one packet flow containing multiple target identities then the LI Management System does not multiply the CC flows as in the prior art.

More in detail, when a packet belonging to one of the packet flows is received by the LI management system, then the method identifies the flows, by extracting from the packet the flow identity, i.e. the sending IAP address of the IAP sending the CC flow, the TID and the CI.

After that, the method comprises checking by identifying in S130 whether there is an on-going packet delivery to the LEA for that TID and CI. In such case if the IP address of the sending IAP (just extracted from the packet) is the same of the on-going packet flow, then the packet is delivered to the LEA over the HI3 interface. Vice versa if the IAP address is not matching then the packet is discarded.

Figure 6:
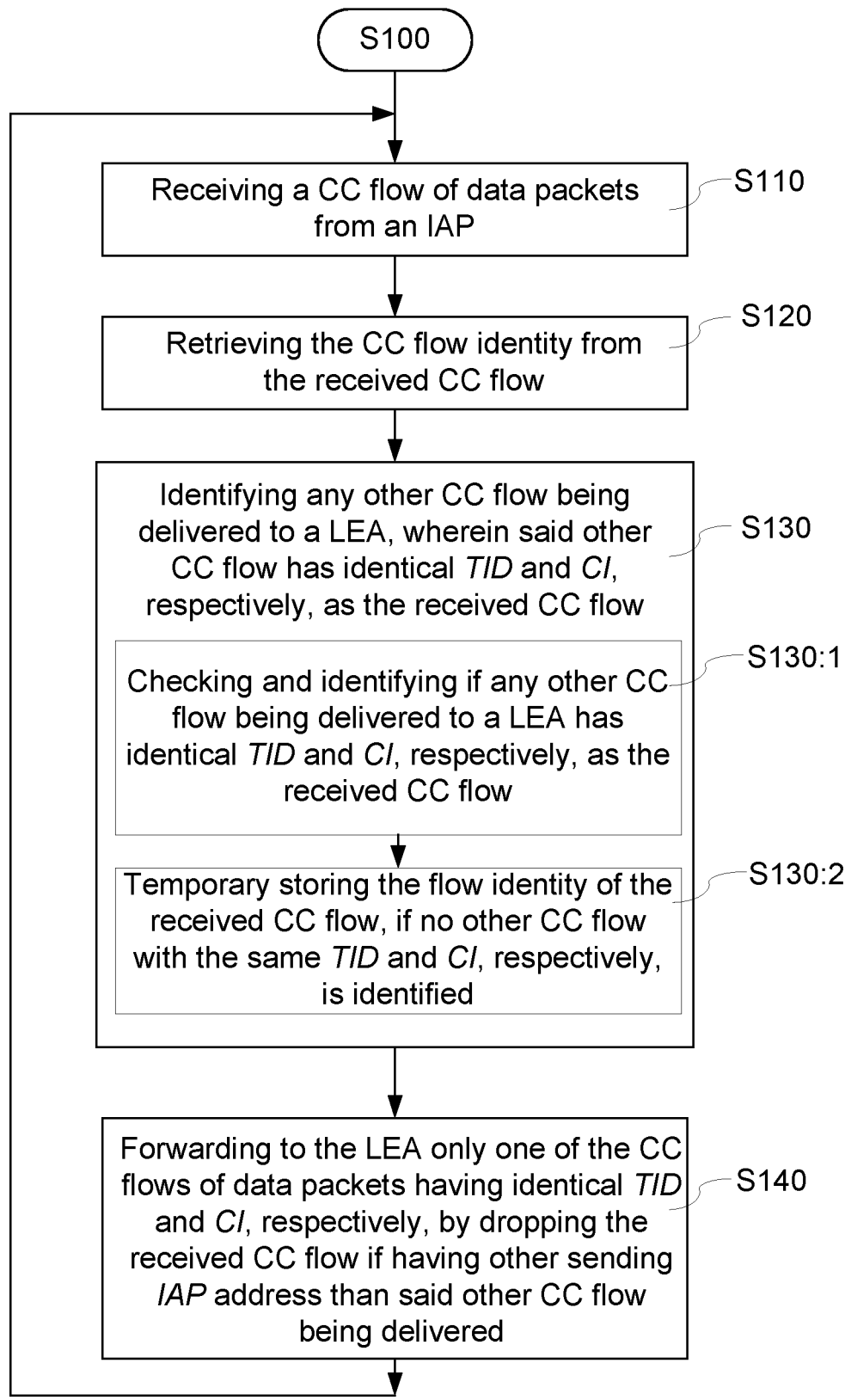
FIG. 6 is a flowchart illustrating an embodiment of the method S100.

FIG. 6 is a flowchart illustrating an embodiment of the method S100. This embodiment may comprise the embodiments of the method S100 as described above in the description of FIG. 5.

According to this embodiment of the method S100, the identifying step S130 comprises:

S130:1: —Checking and identifying if any other CC flow being delivered to a LEA has identical TID and CI, respectively, as the received CC flow;

S130:2: —Temporary storing the flow identity of the received CC flow, if no other CC flow with the same TID and CI, respectively, is identified.

As other CC flows, at least one data packet of each CC flow, being delivered to a LEA are temporary stored in one memory storage, the LI management system is adapted to check and identify if there is any CC flow in the memory storage, which CC flow has identical TID and CI respectively and which deliverance is to a LEA is ongoing.

For handling multi-identity interception, i.e. the packet belonging to a CC flow contains more than one identity, then a TID master identity is used replacing the multi-identity in the data packets of the CC flow and just one CC flow for the different identities is sent to the LEA instead of one flow for each identity of the multi-identity. This embodiment of the method S100 is illustrated in FIG. 7.

Figure 7:
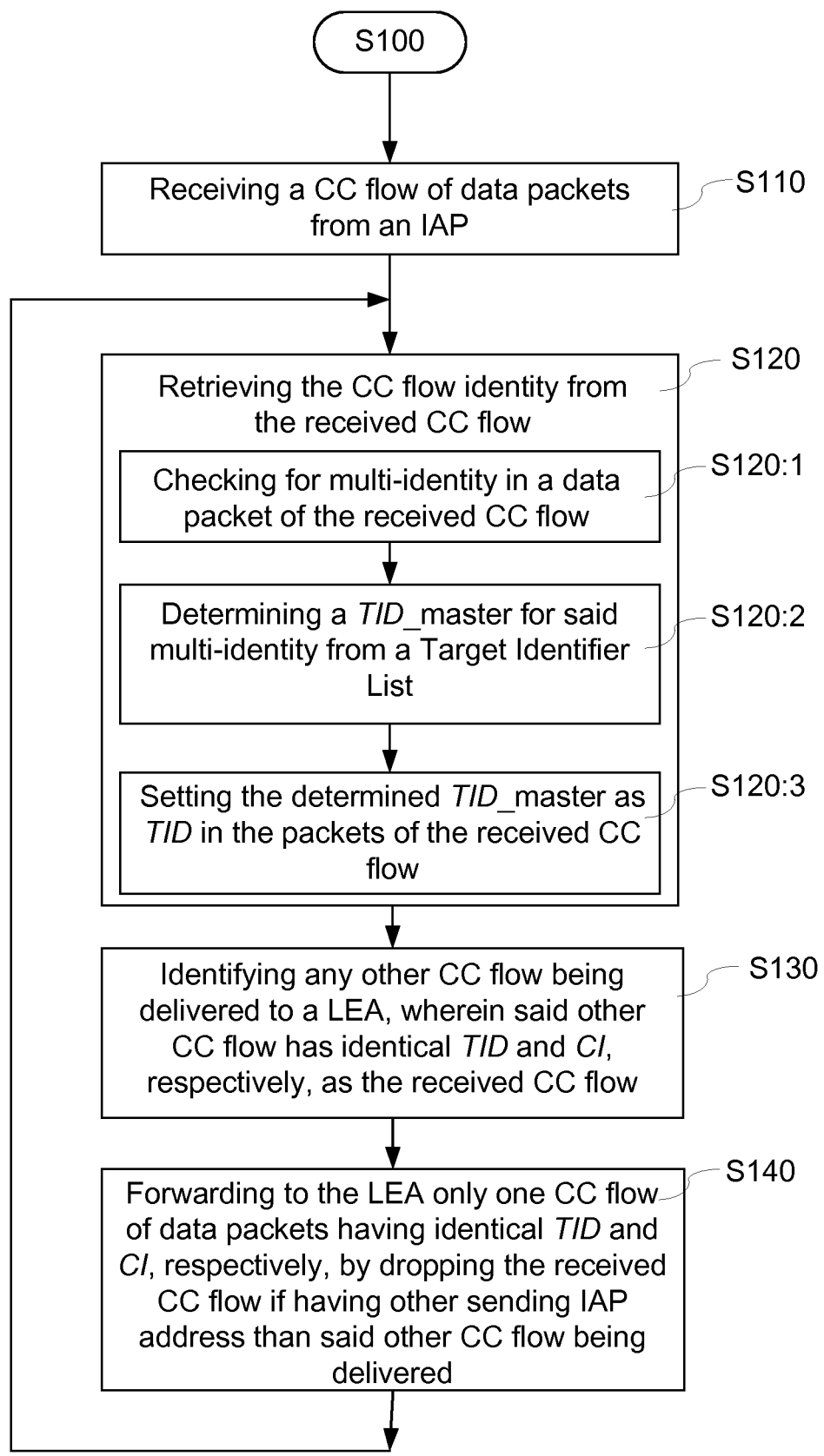
FIG. 7 is a flowchart illustrating further one embodiment of the method S100.

FIG. 7 is a flowchart illustrating further one embodiment of the method S100. This embodiment may comprise any of the embodiments of the method S100 as described above in the description of FIGS. 5 and 6. According to this embodiment of the method S100, the retrieving step S120, i.e. retrieving the CC flow identity from the received CC flow, may further involve:

S120:1: —Checking for multi-identity in a data packet of the received CC flow;

S120:2: —Determining a TID_master for said multi-identity from a Target Identifier List;

S120:3: —Setting the determined TID_master as TID of the received CC flow.

Thus, in S120:1 it is checked by the LI management system if a data packet of the received CC flow comprises a set of TIDs, i.e. multiple identities, of a target. In step S120:2, one of the TIDs is selected as a main TID of the target, a so called TID_master. Such a selection may be performed in different ways: e.g. either it is selected the first identity from the TID list or one of the identities is randomly selected by the system. In step S120:3, the set of TIDs representing the multi-identity is replaced by the TID_master as a TID. As the set of TIDs is replaced in the header of the data packets, the LI management system will only forward one CC flow to the LEA.

Figure 8:
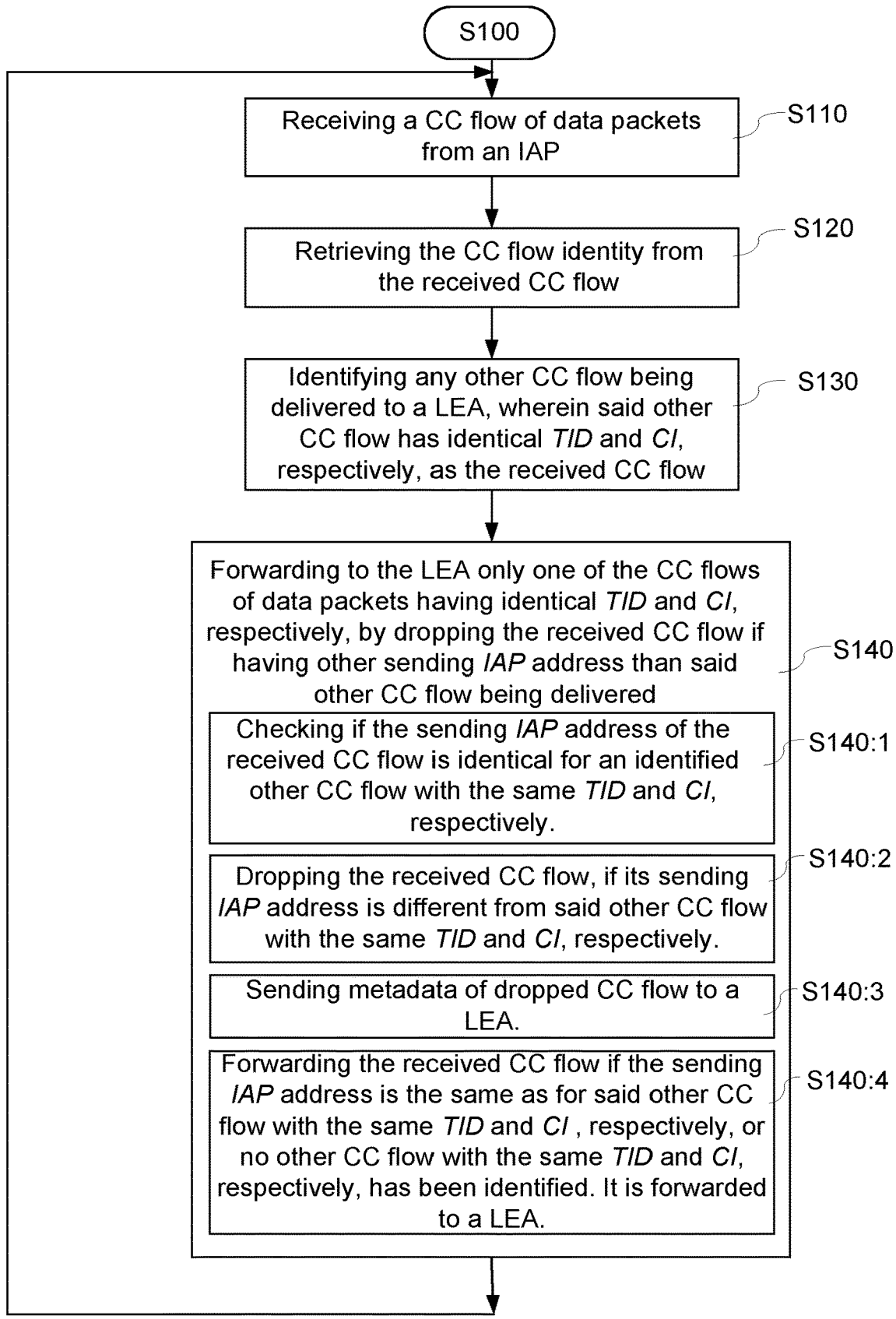
FIG. 8 is a flowchart illustrating further one embodiment of the method S100.

FIG. 8 is a flowchart illustrating further one embodiment of the method S100. This embodiment may comprise any of the embodiments of the method S100 as described above in the description of FIGS. 5, 6 and 7. The embodiment of the method step S140 comprises steps S140:1, S140:2, S140:3 and S140:4.

S140:1: —Checking if the sending IAP address of the received CC flow is identical for an identified other CC flow with the same TID and CI, respectively. The LI management system is also adapted to check the sending IAP addresses of data packets in received CC flows to stored IAP addresses of sending IAPs. Two received CC flows having different sending IAP addresses but identical TID and CI are considered as duplicated, i.e. being identical regarding content, TID and CI but generated by another IAP. Thus, in step S140:1, when a received data packet having identical TID, CI and IAP sending address as data packets in a CC flow of an ongoing delivery, the LI management system is adapted to allow delivery of said data packet, in step S140:4, and to deny delivery of said data packet, if the received flow is determined to be a duplicated flow, i.e. received flow compared to the CC flow being delivered, is dropped in step S140:2.

S140:2: —Dropping the received CC flow, if its sending IAP address is different from said other CC flow with the same TID and CI, respectively. This step means to drop a duplicated CC flow, if sending IAP addresses is not identical for identified other CC flow with the same TID and CI respectively identified.

S140:3: —Sending metadata of dropped CC flow to a LEA.

When a CC flow is processed by the LI management system, and it is identified as a duplicated flow, then metadata is generated and sent to the LEA via the HI3 interface. The metadata includes the relevant information about the duplicated flow which is going to be discarded:

Sending IAP address, IAP, for the IAP sending the CC flow;
Target Identifier (TID);
Correlation Identifier (CI).

S140:4: —Forwarding the received CC flow if the sending IAP address is the same as for said other CC flow with the same TID and CI, respectively, or no other CC flow with the same TID and CI, respectively, has been identified. It is forwarded to a LEA. With a LEA is meant any LEA having requested for interception of the communication sessions of a target, i.e. intercepted user, to which the CC flow belongs.

As an option, it is proposed to notify the LEA, by sending metadata, at the first occurrence of a packet, belonging to a duplicated CC flow, to be discarded.

Figure 9:
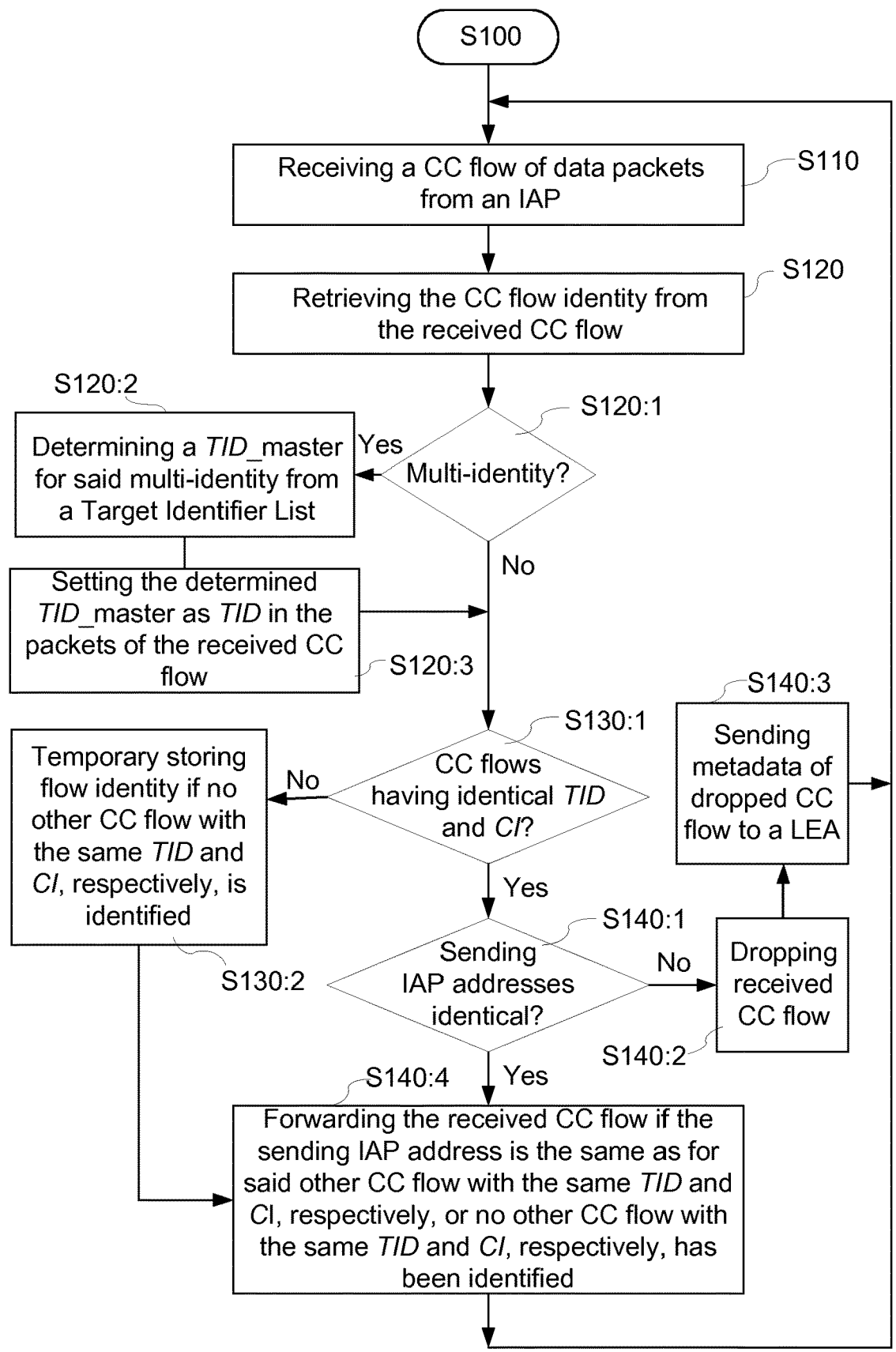
FIG. 9 is a flowchart illustrating further one embodiment of the method S100.

FIG. 9 is a flowchart illustrating further one embodiment of the method S100. This embodiment comprises the embodiments of the method S100 as described above in the description of FIGS. 5, 6, 7 and 8. The first steps S110 and S120 are performed according to the method S100 by:

S110: —Receiving a CC flow of data packets from an IAP.

Then, the steps of S120 are performed:

S120: —Retrieving the CC flow identity of a data packet from the received CC flow.

S120:1: Multi-identity? This means in other words checking for multi-identity in a data packet, i.e. in the header of the data packet, of the CC flow. Thus, it is checked by the LI management system if a data packet of the received CC flow comprises multiple identities of a target.

S120:2: —Determining a TID_master for said multi-identity from a Target Identifier List. In this step, one of the TIDs is selected as a main TID of the target, a so called TID_master. Such a selection may be performed in different ways: e.g. either it is selected the first identity from the list or one of the identities is randomly selected by the system.

S120:3: —Setting the determined TID_master as TID for the received CC flow. In this step, a set of TIDs representing the multi-identity is replaced by the TID_master as a TID. As the set of TIDs is replaced in the header of the data packets, the LI management system will only forward one CC flow to the LEA.

According to the embodiment illustrated in FIG. 9, the step S130 (Identifying any other CC flow being delivered to a LEA, said other flow having identical TID and CI) is also modified. Said step comprises S130:1: —CC flows having identical TID and CI? In this step, as also illustrated for the embodiment in FIG. 6, the TID and CI of other CC flows being delivered are checked and if any of said other CC flows being delivered to a LEA is identified to have identical TID and CI, respectively, as the received CC flow. The LI management system is adapted to compare the TID and CI of the received CC flow with stored TIDs and CIs of being delivered to one or more LEAs.

S130:2: —Temporary storing flow identity of the received CC flow, if no other CC flow with the same TID and CI, respectively, is identified. If there is no other CC flow with the same TID and CI, respectively, identified, "No", the flow identity of the received CC flow is stored in a register together with flow identities of CC flows which delivery to LEAs are ongoing. Then, the received CC flow is allowed for forwarding to the LEA or LEAs having requested CC flows for the sending target, S140. The stored flow identity is further available for comparison with flow identities of later received CC flows.

If there is identified one flow with the same TID and CI/respectively, "Yes", the flow identity of the received CC flow is not stored.

In step S140, forwarding to the LEA only one of the CC flows of data packets having identical TID and CI, respectively, by dropping the received CC flow if having other sending IAP address than the CC flow being delivered, the method may further comprise, S140:1: —Sending IAP addresses identical? This step means checking if the sending IAP address of the received CC flow is identical for an identified other CC flow with the same TID and CI, respectively. The LI management system is also adapted to check the sending IAP addresses of data packets in received CC flows to stored IAP addresses of sending IAPs. Two received CC flows having different sending IAP addresses but identical TID and CI are considered as duplicated, i.e. being identical regarding content, TID and CI but generated by another IAP. Thus, in step S140:1, when a received data packet having identical TID, CI and IAP sending address as data packets in a CC flow of an ongoing delivery, the LI management system is adapted to allow delivery of said data packet, "Yes", in step S140:4, and to deny delivery of said data packet, "No", if the received flow is determined to be a duplicated flow, i.e. received flow compared to the CC flow being delivered, is dropped in step:

S140:2: Dropping the received CC flow, if its sending IAP address is different from said other CC flow with the same TID and CI, respectively. This step means to drop a duplicated CC flow, if sending IAP addresses is not identical for identified other CC flow with the same TID and CI respectively identified.

As stated, if "Yes" in S140:1, then S140:4:

Forwarding the received CC flow if the sending IAP address is the same as for said other CC flow with the same TID and CI, respectively, or no other CC flow with the same TID and CI, respectively, has been identified. It is forwarded to a LEA. With a LEA is meant any LEA having requested for interception of the communication sessions of a target, i.e. intercepted user, to which the CC flow belongs.

As an option, it is proposed to notify the LEA, by sending metadata, at the first occurrence of a packet, belonging to a duplicated CC flow, to be discarded:

S140:3: —Sending metadata of dropped CC flow to a LEA.

When a CC flow is processed by the LI management system, and it is identified as a duplicated flow, then metadata is generated and sent to the LEA via the HI3 interface. The metadata includes the relevant information about the duplicated flow which is going to be discarded:

Sending IAP address, IAP, for the IAP sending the CC flow;
Target Identifier (TID);
Correlation Identifier (CI).

The method and embodiments thereof may be implemented in digital electronically circuitry, or in computer hardware, firmware, software, or in combinations of them. Apparatus of the technique may be implemented in a computer program product tangibly embodied in a machine readable storage device for execution by a programmable processor; and method steps of the technique may be performed by a programmable processor executing a program of instructions to perform functions of the method by operating on input data and generating output.

The method may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a programmable processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially designed ASICs (Application Specific Integrated Circuits).

Figure 10:
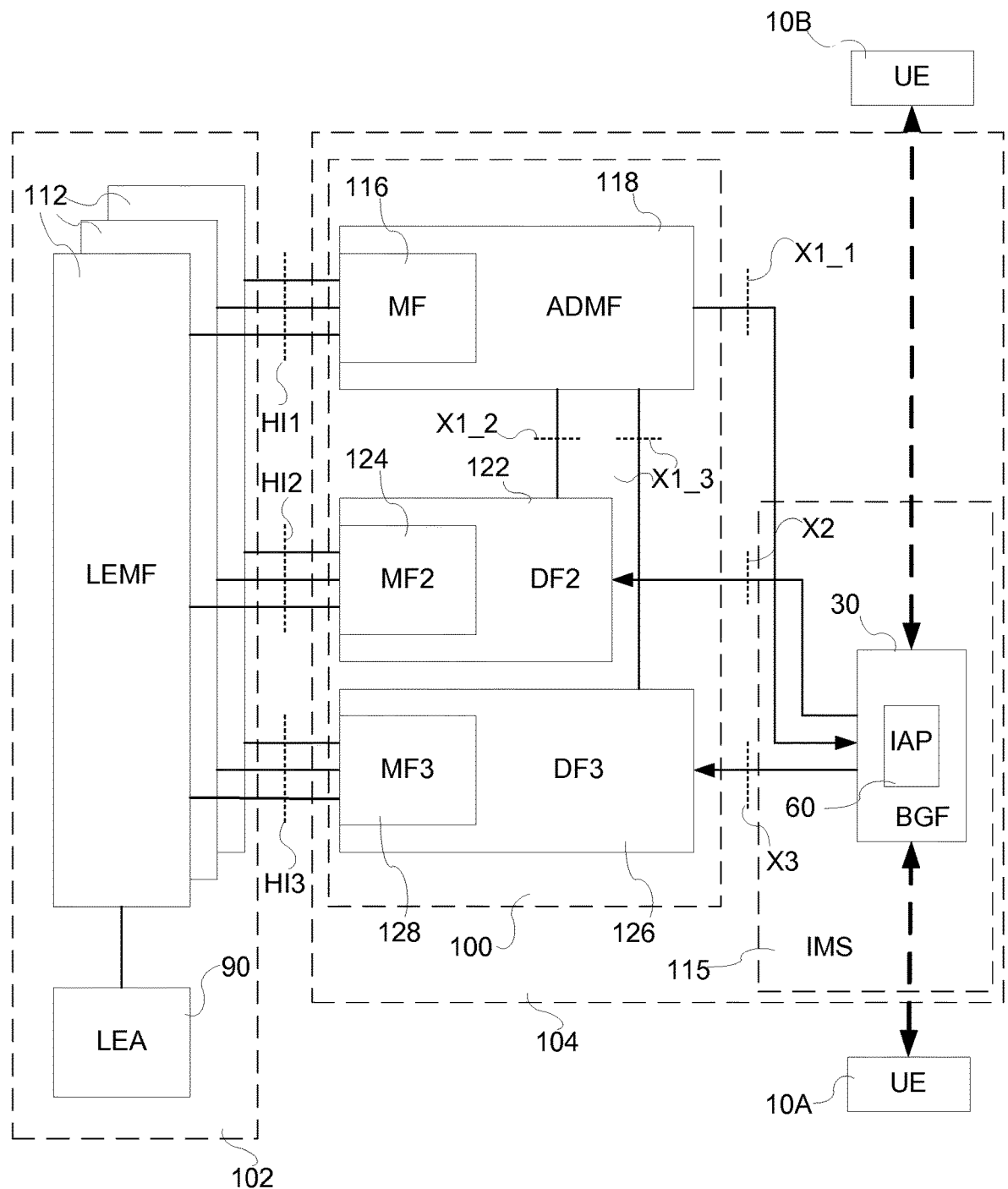
FIG. 10 is a block diagram illustrating a schematic a LI system.

FIG. 10 is a block diagram illustrating a schematic LI system comprising a LI management system, wherein the above described method S100 and corresponding embodiments may be implemented.

Said system and network comprises a number of entities. The exemplary LI system is divided into a LEA domain 102 and operator domain 104. The LEA domain 102 comprises a Law Enforcement Management Function, LEMF, 112 for requesting LI services of the LI system and collecting the intercepted information from the operator domain 104. The system shall provide access to the intercepted Content of Communications, CC, and Intercept Related Information, IRI, of a target and services related to the target on behalf of one or more Law Enforcement Agencies, LEAs 90. A target is a person of interest and/or user equipment possessed or used by the person of interest being surveyed by the LEA. An intercept request, also denoted Request for LI activation, is sent through a first Handover Interface, HI1, located between the Law Enforcement Management Function 112 and an LI system 100 comprising a Mediation Function, MF, 116 and an Administration Function, ADMF, 118. Said Mediation Function 116 and Administration Function 118 generate based on said received request a warrant comprising said one or more target identities, and sends said warrant towards Interception Access Point, IAP, 60 via an interface denoted X1_1. The IAP 60 may be connected to a node of a network, e.g. the Internet, a 3GMS (third generation Mobile Communications System), an Evolved Packet System (EPS), IMS, LTE, etc., from which it intercepts said Content of Communications and Intercept Related Information of a mobile target. Said CC and IRI are network related data. As reference to the standard model, the content of communication is intercepted in the IAP network node and it is based upon duplication of target communication payload without modification. The IAP sends IRI raw data via an interface X2 to a Delivery Function for IRI reporting, DF2, 122 and a Mediation Function of IRI, MF2, 124 that generates and delivers to a collection functionality a standardized IRI report based on the received IRI report. Said standardized IRI report is sent over a standardized interface HI2 to the LEMF 112. The IAP 60 also sends CC raw data via an interface X3 to a Delivery Function for CC reporting, DF3, 126 and a Mediation Function of CC, MF3, 128 which generates and delivers to a collection functionality a standardized CC report based on the received CC report. Said standardized CC report is sent over a standardized interface HI3 to the requesting LEMF 112. The ADMF entity 116 controls and communicates with the Mediation Function and Delivery Function for IRI reporting, MF2/DF2, via the interface X1_2 and the Mediation Function and Delivery Function for CC, MF3/DF3, via the interface X1_3.

Together with the delivery functions it is used to hide from the third generation (3G) Intercepting Access Point IAP entities that there might be multiple activations by different Lawful Enforcement Agencies on the same target.

The HI2 and HI3-interfaces represent the interfaces between the LEA and two delivery functions. The delivery functions are used:
  to distribute the Intercept Related Information (IRI) to the relevant LEA(s) via HI2;
  to distribute the Content of Communication (CC) to the relevant LEA(s) via HI3.

According to known internet access services, all the IP streams related to a given target is intercepted and delivered as a whole session data flow regardless any service used within an interception session.

In FIG. 10, the IAP 60 may be connected to, or contained within any element or node in any layer of an IM Subsystem 115 for intercepting CC flows of data packets between a target A* using a user equipment UE 10A and another user using UE 10B. Examples of such elements or nodes are, as illustrated in FIG. 1, Session Border Gateway (SBG) element 20, Border Gateway Function (BGF) element 30, a Serving Call Session Control Function (S-CSCF) element 40 and Application Servers (ASs) 50. As an example of illustration, the intercepted node of an IMS is a Border Gateway Function (BGF) element 30, which is intercepted for achieving CC flows.

In the other direction, flow of packets comprising content generated by the UE passes the same interfaces, nodes and gateways. When passing the IAP entity, LI is performed.

As described above, a network shall provide access to the intercepted CC and the IRI of the target and services related to the target, e.g. Call Forwarding, on behalf of LEAs. The LEA provides the intercept request, e.g. lawful authorization or warrant to the (telecommunications) operator of the LI system. The intercept request identifies, at a minimum, the target, the type of intercept i.e., IRI-only, or IRI and CC that is authorized, the authorized period for interception, and the LEA delivery address(-es) for the intercepted information.

The operator shall securely administer the intercept (e.g., to activate, deactivate, show, or list targets) within the network as quickly as possible. The operator's administration function shall use appropriate authentication and audit procedures.

As shown, the mediation function sends CC towards LEA over HI3 interface. The HI3 interface is based on Transmission Control Protocol, TCP, in order to ensure data integrity.

Most of IAP uses an X3 interface based on User Datagram Protocol, UDP, protocol for the data packets meanwhile the HI3 interface is based on TCP for the data packets.

Figure 11:
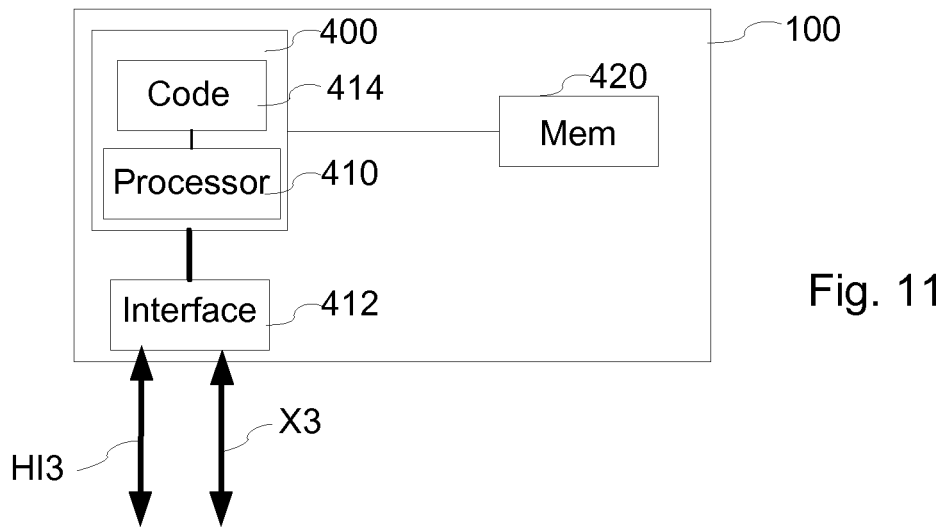
FIG. 11 is a block diagram illustrating an implementation of the method S100 in a LI management system.
Figure 12:
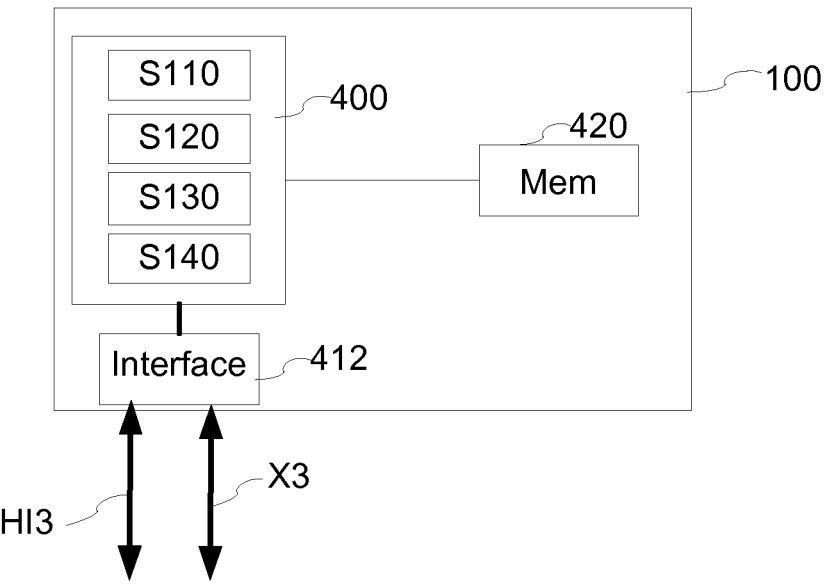
FIG. 12 is a block diagram illustrating one implementation of the method S100 in the LI management system.
Figure 13:
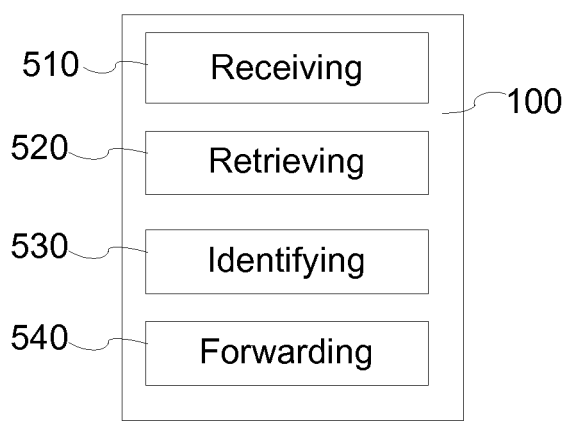
FIG. 13 is a block diagram illustrating another implementation of method S100 in the LI management system.

Various embodiments of a LI management system are illustrated in FIGS. 11, 12 and 13. The LI management system comprises a processor circuitry being adapted to control a delivery function, DF3.

FIG. 11 is a block diagram illustrating one implementation of a LI management system.

The LI management system comprises a processing circuitry 400, which comprises a processor 410 and a memory storage 414 for storing computer program instructions as code and data for enabling the processing of the incoming data. Said processing circuitry 400 may also be used for implementing a Delivery Function DF3, which function already has been described in FIG. 10 (126 in FIG. 10). The processor 410 will receive instructions and data from the memory storage 414 implemented by a read-only memory and/or a random access memory. Storage devices suitable for tangibly embodying computer program instructions and data include all forms of non-volatile memory. Further, a memory storage 420, e.g. a Cache memory, is connected to the processing circuitry 400 for handling incoming CC flows data packages over the X3 interface, e.g. temporary store the flow identity of a received CC flow and for storing a TID list. The processing circuitry 400 is capable of communicating with LEAs via interface 412, which is adapted to communicate with IAPs via interface X3 and with the LEAs via interface HI3. The processor 410 is preferably a programmable processor. The LI management system comprises a processing circuitry 400, which is adapted to operatively perform the steps of:

Receiving a CC flow of data packets from an IAP;
Retrieving the CC flow identity from the received CC flow;
Identifying any other CC flow being delivered to a Law Enforcement Agency, LEA, wherein said other CC flow has identical TID and CI, respectively, as the received CC flow;
Forwarding to the LEA only one of the CC flows of data packets having identical TID and CI by dropping the received CC flow if having other sending IAP address than said other CC flow being delivered.

The processing circuitry 400 may in some embodiments be adapted to operatively perform checking and identifying if any other CC flow being delivered to a LEA has identical TID and CI, respectively, as the received CC flow, and temporary storing the flow identity of the received CC flow, if no other CC flow with the same TID and CI, respectively, is identified.

According to further embodiments, the processing circuitry 400 may be adapted to operatively perform the steps of checking for multi-identity in a data packet of the received CC flow, determining a TID_master for said multi-identity from a Target Identifier List, and setting the determined TID_master as TID in the packets of the received CC flow.

The processing circuitry 400 may in further embodiments be adapted to operatively perform the steps of checking if the sending IAP address of the received CC flow is identical for an identified other CC flow with the same TID and CI, respectively, dropping the received CC flow, if its sending IAP address is different from said other CC flow with the same TID and CI, respectively, and forwarding the received CC flow if the sending IAP address is the same as for said other CC flow with the same TID and CI, respectively, or no other CC flow with the same TID and CI, respectively, has been identified.

The processing circuitry 400 may further be adapted to operatively perform the step of sending metadata of dropped CC flow to a LEA.

Said metadata notifies the LEA that a CC flow has been dropped and comprises the following identifiers, related to the dropped flow:

Sending IAP address of the IAP sending the received CC flow;
Target Identifier (TID);
Correlation Identifier (CI).

FIG. 12 is a block diagram illustrating one implementation of a LI management system.

The LI management system comprises a processing circuitry 400, which comprises a processor 410 and a memory storage 414 for storing computer program instructions as code and data for enabling the processing of the incoming data. Said processing circuitry 400 may also be used for implementing a Delivery Function DF3, which function already has been described in FIG. 10 (126 in FIG. 10). The processor 410 will receive instructions and data from the memory storage 414 implemented by a read-only memory and/or a random access memory. Storage devices suitable for tangibly embodying computer program instructions and data include all forms of non-volatile memory. Further, a memory storage 420, e.g. a Cache memory, is connected to the processing circuitry 400 for handling incoming CC flows data packages over the X3 interface, e.g. temporary store the flow identity of a received CC flow and for storing a TID list. The processing circuitry 400 is capable of communicating with LEAs via interface 412, which is adapted to communicate with IAPs via interface X3 and with the LEAs via interface HI3. The processor 410 is preferably a programmable processor. The LI management system comprises a processing circuitry 400, which is adapted to operatively perform the steps of:

S110: —Receiving a CC flow of data packets from an IAP;
S120: —Retrieving the CC flow identity from the received CC flow;
S130: —Identifying any other CC flow being delivered to a Law Enforcement Agency, LEA, wherein said other CC flow has identical TID and CI, respectively, as the received CC flow;
S140: —Forwarding to the LEA only one of the CC flows of data packets having identical TID and CI by dropping the received CC flow if having other sending IAP address than said other CC flow being delivered.

The processing circuitry 400 may in some embodiments be adapted to operatively perform the steps of:
S130:1: —Checking and identifying if any other CC flow being delivered to a LEA has identical TID and CI, respectively, as the received CC flow; and
S130:2: —Temporary storing the flow identity of the received CC flow, if no other CC flow with the same TID and CI, respectively, is identified.

According to further embodiments, the processing circuitry 400 may be adapted to operatively perform the steps of:
S120:1: —Checking for multi-identity in a data packet of the received CC flow;
S120:2: —Determining a TID_master for said multi-identity from a Target Identifier List, and
S120:3: —Setting the determined TID_master as TID in the packets of the received CC flow.

The processing circuitry 400 may in further embodiments be adapted to operatively perform the steps of
S140:1: —Checking if the sending IAP address of the received CC flow is identical for an identified other CC flow with the same TID and CI, respectively;
S140:2: —Dropping the received CC flow, if its sending IAP address is different from said other CC flow with the same TID and CI, respectively; and
S140:4: —Forwarding the received CC flow if the sending IAP address is the same as for said other CC flow with the same TID and CI, respectively, or no other CC flow with the same TID and CI, respectively, has been identified.

The processing circuitry 400 may further be adapted to operatively perform the step of:

S140:3: —Sending metadata of dropped CC flow to a LEA.

Said metadata notifies the LEA that a CC flow has been dropped and comprises the following identifiers, related to the dropped flow:

Sending IAP address of the IAP sending the received CC flow;
Target Identifier (TID);
Correlation Identifier (CI).

FIG. 13 is a block diagram illustrating another implementation of a LI management system.

According to this embodiment, the LI management system 100 comprises means for receiving or a receiving module 510 that is adapted to receive a CC flow of data packets from an IAP, means for retrieving or a retrieving module 520 that is adapted to retrieve the CC flow identity from the received CC flow, means for identifying or an identifying module 530 that is adapted to identify any other CC flow being delivered to a Law Enforcement Agency, LEA, wherein said other CC flow has identical TID and CI, respectively, as the received CC flow, and sender module or a sender module 540 that is adapted to forward to the LEA only one of the CC flows of data packets having identical TID and CI by dropping the received CC flow if having other sending IAP address than said other CC flow being delivered. The LI management system 100 is capable by said means or modules to support the method S100 and its embodiments.

According to various embodiments, the means for identifying or identifying module 530 may be adapted to check and identify if any other CC flow being delivered to a LEA has identical TID and CI, respectively, as the received CC flow, and temporary store the flow identity of the received CC flow, if no other CC flow with the same TID and CI, respectively, is identified.

According to further various embodiments, the means for retrieving or the retrieving module 520 may be adapted to check for multi-identity in a data packet of the received CC flow, determine a TID_master for said multi-identity from a Target Identifier List, and set the determined TID_master as TID in the packets of the received CC flow.

According to further various embodiments, the means for sending or the sender module 540 may be adapted to check if the sending IAP address of the received CC flow is identical for an identified other CC flow with the same TID and CI, respectively, dropping the received CC flow, if its sending IAP address is different from said other CC flow with the same TID and CI, respectively, and to forward the received CC flow if the sending IAP address is the same as for said other CC flow with the same TID and CI, respectively, or no other CC flow with the same TID and CI, respectively, has been identified.

The means for sending or sender module 540 may, according to various embodiments, optionally be adapted to send metadata of dropped CC flow to a LEA.

The means for sending or sender module 540 may therefore be adapted to generate and send metadata for notifying that a CC flow has been dropped, said metadata involves at least one of following identifiers, related to the dropped CC flow:

Sending IAP address of the IAP sending the received CC flow;
Target Identifier (TID);
Correlation Identifier (CI).

Said LI management system 100 may also be used for implementing a Delivery Function DF3, which function has already been described in FIG. 10 (126 in FIG. 10).

The means, modules and units described above with reference to FIGS. 11, 12 and 13 may be considered as logical units, and do not necessarily correspond to separate physical units. Thus, the person skilled in the art would appreciate that the means, modules and units disclosed in said figures may be implemented as physically integrated units, and/or physically separate units, and that the units are provided with appropriate processing circuits.

It is also provided a computer program comprising computer program code which, when run in a processing circuitry 400 of a LI Management system 100 causes the system to perform the steps of the method S100 and its embodiments which are described above in connection to FIGS. 5 to 9.

It is also provided a computer program product comprising a computer program and a computer readable means on which the computer program is stored.

It is further provided a carrier containing the computer program, wherein the carrier is one of an electronic signal, optical signal, radio signal or computer readable storage medium.

A number of embodiments of the present technique have been described. It will be understood that various modifications may be made without departing from the scope of the technique. Therefore, other implementations are within the scope of the following claims.

The invention claimed is:

1. A method for removing redundant content of communication, CC, flows, which are generated by Lawful Interception of one or more intercepted target communication sessions of intercepted targets, wherein each CC flow comprises a flow of data packets, each data packet comprising a flow identity of the CC flow, wherein the flow identity comprises an address of a sending intercept access point, IAP, at least one identifier of the target, TID, and a communication session Correlation Identifier, CI, the method comprising:
   receiving a CC flow from a sending IAP address, wherein the CC flow comprises a flow of data packets;
   retrieving a CC flow identity from the received CC flow, wherein the flow identity comprises the sending IAP address, a TID, and a CI;
   identifying any other CC flow being delivered to a Law Enforcement Agency, LEA, wherein said other CC flow has an identical TID and CI, respectively, as the received CC flow;
   checking if the sending IAP address of the received CC flow is identical to a sending IAP address of the identified other CC flow with the identical TID and CI, respectively; and
   forwarding to the LEA only one or both of the CC flows having the identical TID and CI, respectively, based on the checking step.

2. The method according to claim 1, wherein the identifying step comprises:
   checking and identifying if any other CC flow being delivered to the LEA has the identical TID and CI, respectively, as the received CC flow; and temporarily storing the flow identity of the received CC flow, if no other CC flow with the identical TID and CI, respectively, is identified.

3. The method according to claim 1, wherein the retrieving step further comprises:

checking for a multi-identity in the data packets of the received CC flow;
determining a TID_master for said multi-identity from a Target Identifier List; and
setting the determined TID_master as the TID in the data packets of the received CC flow.

4. The method according to claim 1, wherein the forwarding step further comprises:
dropping the received CC flow, if the sending IAP address of the received CC flow is different from the sending IAP address of the identified other CC flow with the identical TID and CI, respectively; and
forwarding the received CC flow if the sending IAP address of the received CC flow is identical to the sending IAP address of the identified other CC flow with the identical TID and CI, respectively, or if no other CC flow with the identical TID and CI, respectively, has been identified.

5. The method according to claim 1, further comprising:
sending metadata of the dropped received CC flow to the LEA.

6. The method according to claim 5, wherein the sending step further comprises:
generating metadata to notify the LEA the received CC flow has been dropped, wherein said metadata comprises at least one of the following identifiers, related to the dropped received CC flow:
the sending IAP address of the dropped received CC flow;
the TID of the dropped received CC flow; and
the CI of the dropped received CC flow.

7. A computer program comprising computer program code which, when run in a processing circuitry of a LI management system, causes the system to perform the steps of the method according to claim 1, wherein the computer program is stored on a non-transitory computer readable medium.

8. A Lawful Intercept, LI, management system for removing redundant content of communication, CC, flows, said LI management system being capable of receiving and handling one or more CC flows generated from one or more intercepted communication sessions of intercepted targets, wherein each CC flow comprises a flow of data packets, each data packet comprising a flow identity of the CC flow, wherein the flow identity comprises an address of a sending intercept access point, IAP, at least one target identifier, TID, and a communication session Correlation Identifier, CI, wherein the LI management system further comprises a processing circuitry, wherein the processing circuitry is adapted to:
receive a CC flow from a sending IAP address, wherein the CC flow comprises a flow of data packets;
retrieve a CC flow identity from the received CC flow, wherein the flow identity comprises the sending IAP address, a TID, and a CI;

identify any other CC flow being delivered to a Law Enforcement Agency, LEA, wherein said other CC flow has an identical TID and CI, respectively, as the received CC flow;
check if the sending IAP address of the received CC flow is identical to a sending IAP address of the identified other CC flow with the identical TID and CI, respectively; and
forward to the LEA only one or both of the CC flows having the identical TID and CI, respectively, based on the checking step.

9. The LI management system according to claim 8, wherein the processing circuitry is further adapted to:
check and identify if any other CC flow being delivered to the LEA has the identical TID and CI, respectively, as the received CC flow; and
temporarily store the flow identity of the received CC flow, if no other CC flow with the identical TID and CI, respectively, is identified.

10. The LI management system according to claim 8, wherein the processing circuitry is further adapted to:
check for a multi-identity in the data packets of the received CC flow;
determine a TID_master for said multi-identity from a Target Identifier List; and
set the determined TID_master as the TID in the data packets of the received CC flow.

11. The LI management system according to claim 8, wherein the processing circuitry is further adapted to;
drop the received CC flow, if the sending IAP address of the received CC flow is different from the sending IAP address of the identified other CC flow with the identical TID and CI, respectively; and
forward the received CC flow if the sending IAP address of the received CC flow is identical to the sending IAP address of the identified other CC flow with the identical TID and CI, respectively, or if no other CC flow with the identical TID and CI, respectively, has been identified.

12. The LI management system according to claim 8, wherein the processing circuitry is further adapted to:
send metadata of the dropped received CC flow to the LEA.

13. The LI management system according to claim 12, wherein the said metadata notifies the LEA the received CC flow has been dropped and wherein the metadata comprises at least one of the following identifiers, related to the dropped received CC flow:
the sending IAP address of the dropped received CC flow;
the TID of the dropped received CC flow; and
the CI of the dropped received CC flow.

* * * * *